United States Patent [19]

Sullivan et al.

[11] 3,824,548

[45] July 16, 1974

[54] SATELLITE COMMUNICATIONS LINK MONITOR

[75] Inventors: Dean R. Sullivan, Lakeside; James E. Pohl, San Diego, both of Calif.

[73] Assignee: The United States of America as represented by the Secretary of the Navy, Washington, D.C.

[22] Filed: Jan. 15, 1973

[21] Appl. No.: 323,497

[52] U.S. Cl. .. 340/146.1 E, 178/69.5 R, 179/15 BS, 325/41, 325/325, 325/363

[51] Int. Cl. ..... H04b 1/00, H04b 7/00, G08c 25/00

[58] Field of Search .................. 178/69.5, 69.5 RA; 179/15 AE, 15 BF, 15 BS, 175.3; 340/146.1 E; 325/4, 41, 42, 325, 363, 31

[56] References Cited

UNITED STATES PATENTS

| | | | |
|---|---|---|---|
| 3,057,972 | 10/1962 | Mann | 179/15 BF |
| 3,315,228 | 4/1967 | Futerfas et al. | 340/146.1 E |
| 3,371,165 | 2/1968 | Earle et al. | 179/15 BF |
| 3,496,536 | 2/1970 | Wheeler et al. | 340/146.1 E |
| 3,562,710 | 2/1971 | Halleck | 178/69.5 R |

*Primary Examiner*—Albert J. Mayer
*Assistant Examiner*—Marc E. Bookbinder
*Attorney, Agent, or Firm*—R. S. Sciascia; G. J. Rubens

[57] ABSTRACT

In satellite relay communication systems, apparatus for automatically measuring and indicating in real time, the absolute bit error rate introduced in a transmitted bit stream by the data link. In an exclusive test mode, a selectively predetermined random or fixed code sequence is transmitted over the link. At a receiver site, the identical, reference code sequence is generated for comparison, on a bit-by-bit basis, with the transmitted sequence after bit and code synchronization are completed.

4 Claims, 5 Drawing Figures

SATELLITE COMMUNICATIONS LINK MONITOR

BACKGROUND OF THE INVENTION

To meet increasing fleet communication requirements, the United States Navy has advantageously employed satellite relay fleet broadcast systems. In using these digital systems, it is of the utmost importance that transmission errors generated by the corresponding data link be detected and measured to allow for corrective measures to be undertaken. Prior art approaches generally function by transmitting a coded signal simultaneously with transmitted data signals. At a receiver site, the coded signal is isolated and compared with a locally generated coded signal identical to that transmitted. These techniques, however, have the disadvantage that they measure relative error and do not measure a true error rate since they are dependent on data rate.

SUMMARY

Apparatus are disclosed for automatically measuring and visually indicating bit error rate of communications data links. In a satellite relay system, the apparatus transmits, during an exclusive test mode, a fixed or random code sequence. The sequence is relayed by an earth orbiting satellite to receiving stations wherein after the incoming bit stream is received, it is bit synchronized and code synchronized; it is then automatically compared on a bit-by-bit basis with a locally generated bit stream. Once acquisition is completed, the apparatus provides continuous phase tracking even at high error rates and resynchronization is not required except for severe or prolonged fading or loss of signal. If loss of signal occurs, the apparatus will automatically reacquire the signal with respect to both bit phase and code without operator intervention.

OBJECTS OF THE INVENTION

It is a primary object of the present invention to provide apparatus for monitoring and visually indicating errors introduced in a transmitted bit stream of a satellite broadcast communication system by a satellite data link.

It is another object of the present invention to provide digital error monitoring equipment for satellite communication systems which automatically bit-phase locks directly from the incoming bit stream to be monitored and which phase tracks variations in timing due to changes in range, source oscillator drift, etc.

It is a further object of the present invention to provide apparatus as above described which can compare, on a bit-by-bit basis, a received incoming bit stream, having bit timing and reference coding, with respect to a reference, locally generated bit stream and to visually indicate the measured error differences.

Other objects, advantages and novel features of the invention will become apparent from the following detailed description of the invention when considered in conjunction with the accompanying drawings.

DESCRIPTION OF THE PREFERRED EMBODIMENT

Figure 1:
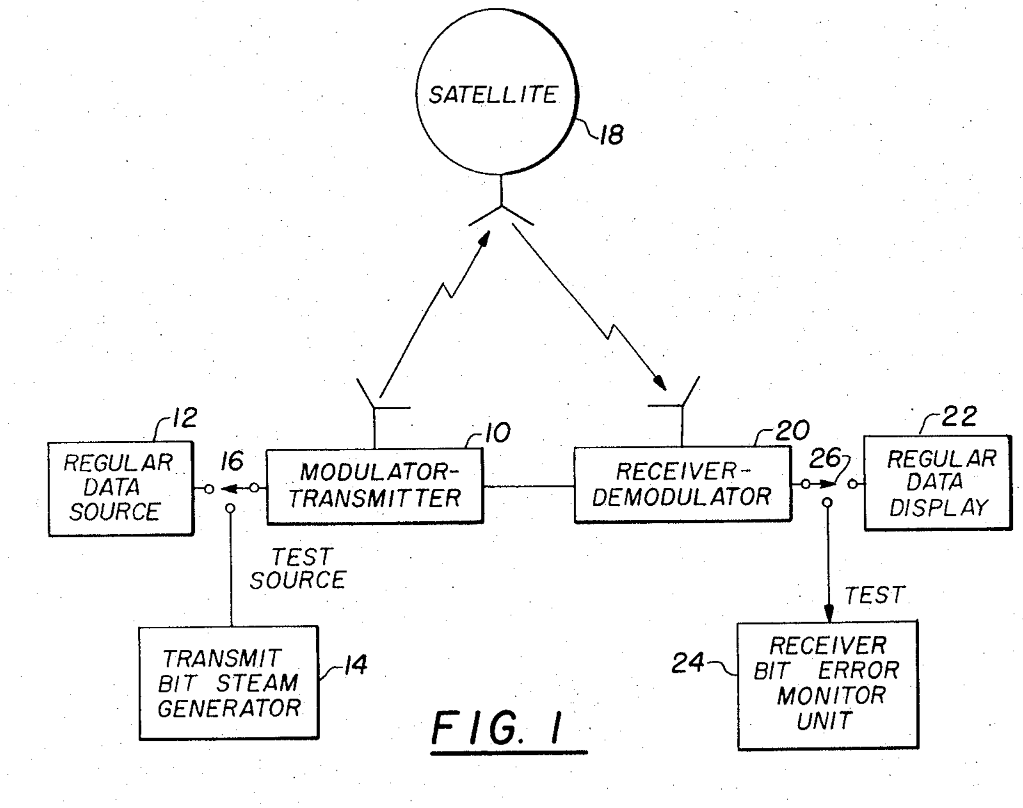
FIG. 1 is a simplified block diagram of a satellite relay communication system employing the novel monitoring concept to be disclosed herein.

FIG. 1 illustrates in simplified block diagram form a typical satellite communication relay system such as a satellite fleet broadcast system currently employed by the United States Navy. The system essentially comprises an earth transmitting station including conventional modulator-transmitter apparatus 10 which transmits digital data from a data source 12. Also shown in FIG. 1 at the earth transmitting station is a transmit bitstream generator 14 which can be switched directly to the modulator-transmitter 10 by means of the switch 16 thereby bypassing the output of the data source 12. The generator 14 provides a fixed or random code sequence for transmission by the transmitter 10.

The transmitted data or code sequence is relayed by the earth orbiting satellite 18 to an earth receiving station which could comprise, for example, a ship. The receiving station comprises conventional receiver-demodulator apparatus 20 for receiving the incoming digital data or bit stream. The data received is displayed on data display device 22 in a conventional manner.

The receiver system further includes a receiver bit error monitor unit 24. The output of the receiver-demodulator 20 is coupled to the monitor unit 24 by the switching action of the switch 26 whereby the coded sequence can be monitored to measure and visually indicate the digital error generated in the satellite communication link in a manner to be described hereinafter.

The transmitter bit stream generator 14 can provide both random and fixed codes to allow a more meaningful probe of the communications link and the receiving equipment, and coding can be in a teletype code format wherein fixed start-stop bits encompass eight variable or manually selectable bits. Coding is introduced, recovered and compared at baseband, thus the method of RF carrier modulation is inconsequential.

As stated above, at the receiving site, a receiver bit stream generator (in the bit error monitor unit 24) outputs the same code sequence as that transmitted for comparison purposes. The time of arrival of the transmitted sequence is unknown since it is a function of distance, filter phase lag, etc.; therefore the receiver error monitor unit 24 must acquire bit and code synchronization, in that order. The unit can then compare on a bit-by-bit basis the incoming bit stream against the perfect identical bit stream generated locally.

Once acquisition has been completed, which can occur in one to two seconds, the receiving apparatus 24 can then provide continuous phase tracking even at high error rates (low input S/N ratios). Furthermore, resynchronization is not required except for severe or prolonged fading or if loss of signal occurs. Even under marginal continuous link operating conditions exceeding 20 percent error rate, the loss of tracking will normally not occur.

In the event that loss of signal occurs, the unit 24 will automatically reacquire the signal in both bit phase and code without operator intervention. Furthermore it will provide a visual indication and marker on, for example, a paper printout indicating that reacquisition occurred which invalidates the immediate portion of the data.

Obviously the unit 24 itself must be relatively error-free for all practical purposes. Since error rates as low as one part in $10^6$ are measured by the unit, the self-generated error should be no greater than one part in $10^8$. Such an error rate can be achieved with the apparatus shown in FIGS. 1, 2, and 3.

Figure 2:
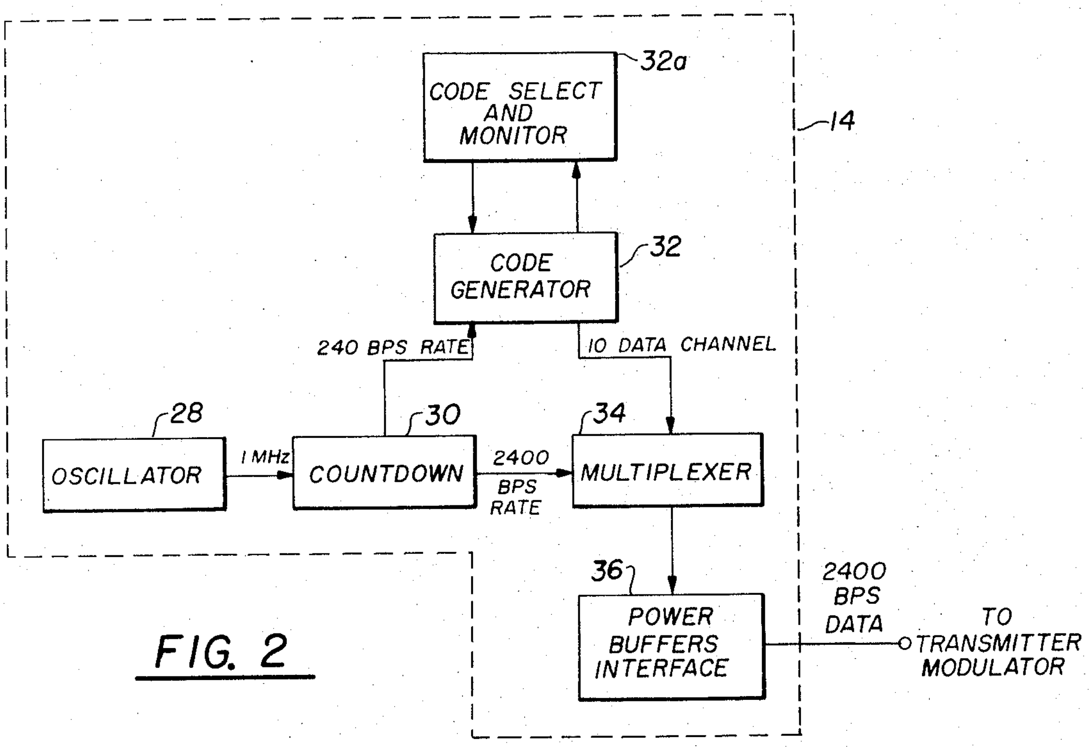
FIG. 2 is likewise a simplified block diagram of the transmitter bit stream generator of FIG. 1 and which provides a fixed or random code sequence to be transmitted.

FIG. 2 is a simplified block diagram of the transmitter bit-stream generator 14 shown in FIG. 1. The generator comprises a conventional oscillator 28 whose output is coupled to a countdown circuit 30. The output of the countdown circuit 30 is in turn applied to a test code generator 32 and a conventional multiplexer 34. The output of the code generator 32 is fed to the multiplexer 34, and the output of the multiplexer is fed to the transmitter-modulator through an output interface circuit 36 (power buffers).

Experimentally it has been determined that if, for example, the oscillator 28 is used with a temperature controlled crystal at 1-MHz, a frequency stability much better than one part in $10^6$ is achieved, thereby eliminating any requirement for retuning. The oscillator further allows external synchronization to be accomplished should the need for it arise.

The countdown circuit 30, in response to the 1-MHz output of the oscillator, provides a 2,400 bit rate to the multiplexer 34, and a 240 bit rate to the code generator 32. The multiplexer 34 can comprise a ten-bit multiplexer which sequentially samples the ten data outputs of the code generator 32 and provides a desired serial bit stream output in response thereto.

The test code generator 32 comprises a fixed start bit (logic "1") and a fixed stop bit (logic "0") encompassing eight variable or fixed (1 or 0) bits and is referred to as a byte in the remainder of this disclosure. In the random mode the eight variable bits are obtained from an eight-bit binary counter which is stepped at a 240 bit per second rate by the 240 bps output from the countdown circuit 30. Consequently a particular byte is repeated at approximately 1.1 second intervals, for the exemplary values described. The generator 32 includes means for selecting a particular code and viewing the code combinations selected. The code selected is established by mutual understanding between transmitter and receiver personnel to thereby obtain the error data. The output interface circuit 36 comprises power buffers configured to allow driving the next stage in the transmitter.

Figures 3, 5:
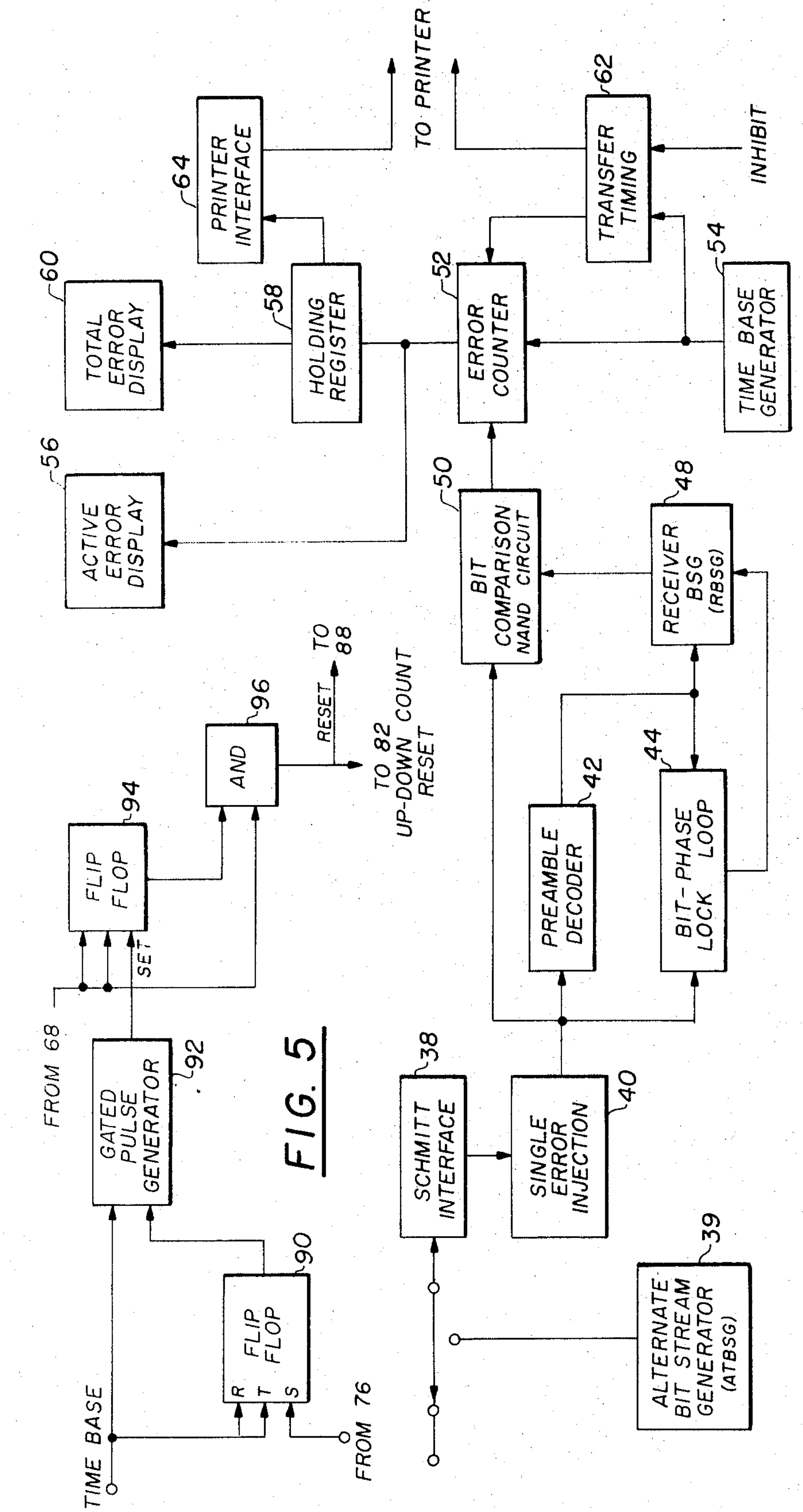
FIG. 3 is a simplified schematic block diagram of the receiver error monitor unit which accomplishes the aforementioned bit-by-bit comparison.
FIG. 5 is a schematic of the out-of-lock monitor 80 of FIG. 4.

FIG. 3 illustrates in block diagram form the receiver error monitor unit 24 shown in FIG. 1. This self-contained unit requires only AC power for self check and can be readily interfaced to a digital receiving system which is to be monitored. In general, the design and operation of the monitor unit encompasses the following objectives and requirements.

The unit should provide rapid interfacing with signal data sources via an adjustable high impedance threshold. The unit must generate bit timing and reference coding and should allow automatic bit phase lock directly from the bit stream to be monitored and should further be able to phase track the variations in timing due to changes in ranges, etc.

The unit should also have a tracking memory (i.e., a fly-wheel action) so that tracking is not lost due to erroneous incoming signals, and it should also "ride out" normal signal fades.

The unit should provide automatic code synchronization of the receiver bit stream generator to the transmitter bit stream generator, and it should compare on a bit-by-bit basis the received bit stream to the reference bit stream and should indicate and print out the error difference. Finally, the device should be operable with selectively predetermined error ranges to accommodate various applications; and it should also be operable in a parallel manner with other devices by some multiplexing means to allow the introduction of additional information such as time of day, adjacent channel error rates, etc. The input terminal of the monitor unit comprises a Schmitt circuit 38 which functions as an adjustable interface circuit to accommodate a range of input logic levels. The output of the circuit 38 is fed to single-error injection circuit 40 which provides 1-bit hold, sensing, and altering to provide a single error to be injected each time base interval. This function is used during self test to insure that the error counter displays and associated circuitry are operational.

The preamble decoder or word recognizer 42 which is connected to the output of circuits 38 and 40 comprises a 32-bit shift register which performs decoding of the incoming bit stream to allow the receiver bit stream generator to be code synchronized from the remote bit stream generator at the transmitter site. A long preamble is provided to remove the possibility of false lock occurring and consequent erroneous error recording in a high-noise environment. The preamble is normally transmitted once each second; however, flywheel action of the bit-phase lock loop 44 removes the requirement for continuous decode action. Consequently, once phase lock is obtained, synchronization will be retained at S/N ratios where it would be nearly impossible to satisfy this long preamble.

The phase lock loop 44 includes a receiver oscillator 86 which comprises a voltage controlled oscillator with a temperature compensated crystal at a nominal frequency of 1-MHz. The unit provides the basic error monitor timing and has an adjustable range to allow tracking the incoming bit stream. Input voltage control is band limited to allow smooth tracking from a bit stream corrupted by random burst timing interferences.

The output of the loop 44 is fed to the receiver bit stream generator 48.

The bit comparison circuit 50 allows bit-by-bit comparison of the "pure" output code from the receiver bit stream generator and the corrupted incoming bit stream. If a difference is sensed, the circuit 50 produces a pulse which is fed to the error counter 52 for recording. The error counter comprises a three-decade counter which stores errors during the time period established by the time base generator 54. The contents of this counter are applied to the active error display 56 for immediate visual readout of current errors. The contents of the counter are also transferred at the end of each time-base interval to the holding register 58 and total error display unit 60 whereby the total number of errors for the last time interval are displayed and recorded.

The active error display 56 accepts the BCD coded inputs from the error counter 52 and provides the BCD-to-decimal conversion circuitry necessary to drive nixie display tubes. The holding register 58 provides 1-bit storage to hold the totalized error data for display and to allow the data to be transferred to a printer. It also holds data such as time base used, override, and loss of lock.

The total error display 60 accepts error data from the holding register 58 and performs the BCD-to-decimal conversion necessary to drive the display tubes indicating the total number of errors occurring in the last time base interval. The time base generator 54 comprises a six-decade counter which provides the necessary time base intervals. A time base select switch can be used to allow selection of a predetermined time base such as 10bit intervals.

The transfer timing circuit 62 establishes the timing for the transfer, print, reset, etc., functions which occur immediately after the last bit in the time base interval. The circuit also allows an inhibit command from the external printer to block the print command in the event the printer is inadvertently manually commanded.

The printer interface circuit 64 provides the buffering and voltage level conversion necessary to mate with either the older type printers which use negative voltages or with newer units which use positive micrologic levels.

The bit phase lock loop 44 comprises a network which controls the voltage controlled oscillator 86 to in turn allow a "clean" 2,400 bit clock to be furnished from the receiver bit stream generator 48 in phase with the incoming bit stream which is normally corrupted by erroneous time transitions. The unit has a tracking memory which allows it to retain fades during signal phase.

Figure 4:
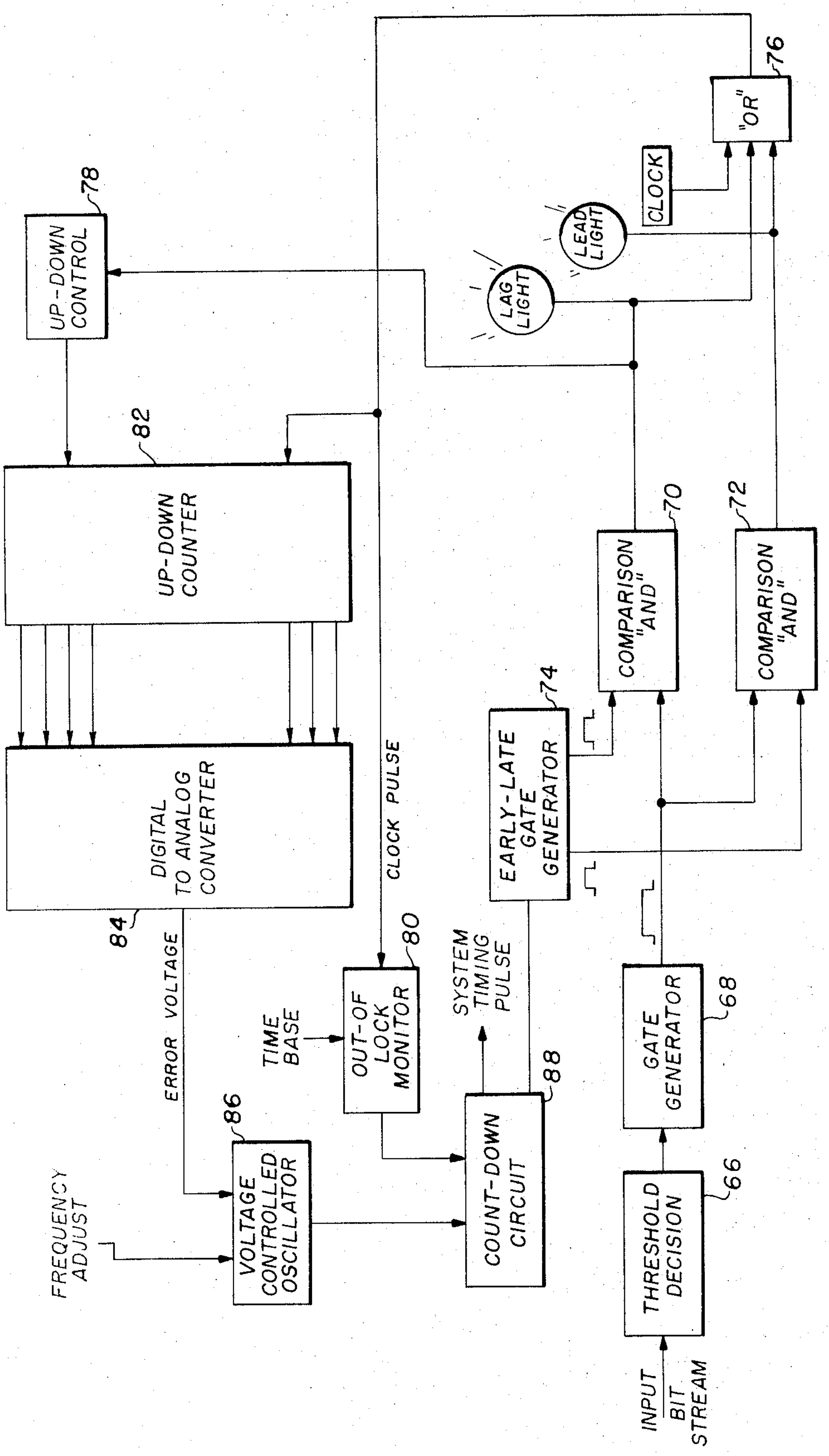
FIG. 4 is a schematic drawing of the bit-phase lock loop 44 of FIG. 3.

The bit-phase lock loop 44 is shown schematically in FIG. 4. Incoming bit streams are coupled to the threshold decision circuit 66 whose output activates the gate generator 68.

The pulse output from the generator 68 is coupled to the comparison AND gates 70 and 72 which also receives pulse inputs from the early-late gate generator 74.

The outputs from the circuits 70 and 72 are applied to the "OR" gate 76 and from 70 to the up-down counter 78.

The output from the "OR" gate 76 is connected to the out-of-lock monitor 80 and to the up-down counter 82 which also receives an input from the counter 78.

The counter 82 output is converted from digital to analog by the D-A converter 84 whose error voltage output is routed to the voltage controlled oscillator 86 which controls the count down circuit 88 which produces the system timing pulses. The output from the out-of-lock monitor 80 is applied as a reset pulse to the count-down circuit 88 which produces a system timing pulse in response thereto. The timing pulses produced are coupled to the bit stream generator 48 as bit synchronization pulses.

FIG. 5 illustrates a possible configuration of the out-of-lock monitor 8. Essentially circuit comprises a flip-flop circuit, a gated pulse generator 92, a second flip-flop circuit 94, and an AND gate 96, connected as shown in FIG. 5.

In operation, bit lock-on occurs as follows. The tracking mechanism accepts a single transition from the incoming bit stream and resets the bit stream generator 48 to time zero and sets the voltage controlled oscillator to 1-MHz nominal. "Early" and "late" gates occurring at a 2,400 bit rate are formed encompassing this accepted transition. Assuming the transition was a legitimate bit timing, the tracking mechanism phase tracks the incoming bit transitions maintaining the incoming transition times and the early and late gate intervals.

The unit will block any future single injections from the unit 40 from resetting phase time, however if the initial transition injection was an error the track will be dropped after four seconds. This process continues until the legitimate, i.e., repetitious, bit timing is obtained consequently tracking lock-on time varies from instantaneous with moderately good signal to many seconds at a higher error rate.

The unit can retain tracking at a much higher error rate than it can conveniently acquire initial lock-on. The loss of lock at the maximum allowable error rate results in a gradual loss of control allowing the incoming bit stream to drift out of the selectively predetermined area of control. Tracking memory is retained in an up-down counter with a digital to analog output which performs a filtering action by imposing restricted rates of change. To regain track control the up-down counter can be immediately preset to force the oscillator to the nominal 1-MHz frequency. Nixie lights can be provided to monitor the correlation of the early and late gates with incoming bit transition ties.

The alternate transmitter bit stream generator comprises built in test equipment which is used to allow a rapid check-out of the unit prior to communication tests. The unit is provided with separate controls to allow setting up the code desired and identical to that available at the transmitter site. These controls allow checking the error monitor unit with a perfect signal input for a known amount of error and its outputs are available for use in driving a balanced modulator for a check-out of the communications receiving equipment.

Obviously many modifications and variations of the present invention are possible in the light of the above teachings. It is therefore to be understood that within the scope of the appended claims the invention may be practiced otherwise than as specifically described.

What is claimed is:

1. Automatic apparatus for measuring in real time, bit error rate of digital communication links and comprising:

at a transmitter station, bit stream generator means for transmitting a bit stream comprising a selectively predetermined baseband first code sequence;

digital communication link means for transmitting said bit stream to receiver stations;

at a receiver station, means for receiving said bit stream from said digital link;

bit error rate monitor means connected to said receiver means and comprising, bit phase lock loop means for automatically and sequentially acquiring bit synchronization of said received bit stream by locking directly to the bit phase thereof and for phase tracking variations in timing due to transmission thereof over said digital link to provide timing signals substantially in phase with said received bit stream;

decoder means connected to the output of said receiver means for decoding said incoming bit stream to provide a code synchronization output;

local bit stream generator means connected to the output of said loop means and to the output of said decoder means and being responsive thereto to produce a reference code sequence substantially identical to said first code sequence and in bit and code synchronism therewith before transmission thereof over said digital link;

bit comparison means connected to the output of said receiver means and to the error pulse of said reference bit stream generator means to compare on a bit-by-bit basis said received bit stream with respect to said local code sequence to produce an output if a difference is sensed;

counter means connected to the output of said comparison means;

time base generator means for providing a selectively predetermined time base comprising a fixed number of bits to said counter means whereby the output of said counter means comprises the ratio of error pulses to said number of bits.

storage means connected to the output of said counter means for storing the contents thereof each time base; and display means connected to the output of said storage means for displaying the contents thereof and comprising bit error rate of said bit stream.

2. The apparatus of claim 1 wherein said decoder means comprises a logical shift register.

3. The apparatus of claim 1 wherein said bit phase lock loop means includes tracking memory means for retaining phase during transmission fades.

4. The apparatus of claim 3 wherein said tracking memory means comprises an up-down counter.

* * * * *